United States Patent
Muto (10) Patent No.: US 7,320,429 B2
(45) Date of Patent: Jan. 22, 2008

(54) SELF-SCANNING SYSTEM AND PURCHASED-ITEM REGISTERING APPARATUS, PURCHASED-ITEM REGISTERING METHOD, AND COMPUTER PRODUCT

(75) Inventor: Yuko Muto, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 399 days.

(21) Appl. No.: 11/174,510

(22) Filed: Jul. 6, 2005

(65) Prior Publication Data

US 2006/0196935 A1 Sep. 7, 2006

(30) Foreign Application Priority Data

Mar. 2, 2005 (JP) ............... 2005-057743

(51) Int. Cl.
- G06K 15/00 (2006.01)
- A63F 9/02 (2006.01)
- G06Q 20/00 (2006.01)

(52) U.S. Cl. ............ 235/383; 186/59; 186/61; 705/16; 705/20; 705/23

(58) Field of Classification Search ........... 235/383; 186/59, 61, 66; 705/16, 20, 23
See application file for complete search history.

(56) References Cited

U.S. PATENT DOCUMENTS

| | | | | |
|---|---|---|---|---|
| 5,426,282 A | * | 6/1995 | Humble | 235/383 |
| 5,914,473 A | * | 6/1999 | Gresky | 235/383 |
| 6,155,489 A | * | 12/2000 | Collins et al. | 235/462.01 |
| 6,598,791 B2 | * | 7/2003 | Bellis et al. | 235/383 |
| 6,794,586 B1 | * | 9/2004 | Mason | 177/25.15 |
| 6,845,910 B2 | * | 1/2005 | Gu et al. | 235/454 |
| 7,036,726 B1 | * | 5/2006 | Edwards | 235/383 |
| 7,040,455 B2 | * | 5/2006 | Bogat | 186/61 |
| 7,070,097 B2 | * | 7/2006 | Blanford et al. | 235/383 |
| 7,118,026 B2 | * | 10/2006 | Harris et al. | 235/375 |
| 7,168,525 B1 | * | 1/2007 | Jacobs | 186/61 |

FOREIGN PATENT DOCUMENTS

JP 10-302156 11/1998

* cited by examiner

*Primary Examiner*—Daniel Hess
(74) *Attorney, Agent, or Firm*—Staas & Halsey LLP (57) ABSTRACT

A specific-item-information storing unit stores information on a specific item that can be contained in one container together with other item. A specific-item judging unit judges, when the registration for the purchased-item is received, whether the purchased-item is a specific item based on the information stored. A reception control unit controls, when the specific-item judging unit judges that the purchased-item is a specific item, a self-scanning system to continue to receive a registration for other purchased-item and to perform a weight determination according to an instruction for completing the registration from a customer.

6 Claims, 9 Drawing Sheets

ITEM INFORMATION DB
17a

| ITEM CODE | IMAGE DATA | DISPLAY NAME | SPECIFIC ITEM FLAG | UNIT PRICE | UNIT WEIGHT |
|---|---|---|---|---|---|
| 20001235 | LETTUCE IMAGE | LETTUCE | 0 | 150円 | 50g |
| 20001236 | CUCUMBER IMAGE | CUCUMBER | 0 | 100円 | 40g |
| 30001233 | PRAWN TEMPURA IMAGE | PRAWN TEMPURA | 1 | 150円 | 50g |
| 30001234 | KAKIAGE IMAGE | KAKIAGE | 1 | 200円 | 30g |
| 40001235 | DONUT A IMAGE | DONUT A | 1 | 150円 | 20g |
| 40001236 | DONUT B IMAGE | DONUT B | 1 | 100円 | 30g |
| 50001237 | PERSIMMON IMAGE | PERSIMMON | 0 | 200円 | 60g |
| 50001238 | ORANGE IMAGE | ORANGE | 0 | 200円 | 50g |
| ⋮ | ⋮ | ⋮ | ⋮ | ⋮ | ⋮ |

FIG.4

PURCHASE INFORMATION DB
17b

| CUSTOMER ID | DATE AND TIME | ITEM CODE | NUMBER | PRICE | TOTAL PRICE |
|---|---|---|---|---|---|
| U00001 | 050331/17:30 | 20001236 | | 100円 | 2550円 |
| | | 30001233 | 2 | 300円 | |
| | | 30001234 | 2 | 400円 | |
| | | ⋮ | | ⋮ | |
| ⋮ | ⋮ | ⋮ | ⋮ | ⋮ | ⋮ |

-PURCHED-ITEM-

LETTUCE ¥138

SUB TOTAL: ¥138

! CALL ATTENDANT

PLEASE PUT ITEM IN SHOPPING BAG

ITEM SELECTION | LARGE ITEM

¥ PAYMENT

× CANCEL | WEIGHT OF ITEM | 390g

(J)

-PURCHED-ITEM-

LETTUCE ¥138

SUB TOTAL: ¥138

! CALL ATTENDANT

PLEASE SCAN ITEM

ITEM SELECTION | LARGE ITEM

¥ PAYMENT

× CANCEL | WEIGHT OF ITEM | 0g

SELF-SCANNING SYSTEM AND PURCHASED-ITEM REGISTERING APPARATUS, PURCHASED-ITEM REGISTERING METHOD, AND COMPUTER PRODUCT

BACKGROUND OF THE INVENTION

1. Field of the Invention

The present invention relates to a technology for receiving a registration for a purchased-item from a customer and performing a weight determination for the purchased-item.

2. Description of the Related Art

Conventionally, in supermarkets and the like, a self-scanning system has been introduced for reducing labor costs required for salesclerks. With the self-scanning system, customers themselves register purchased-items and perform a payment for the purchase (see, for example, Japanese Patent Application Laid-Open No. H10-302156). When a purchased-item is attached with a barcode, such a self-scanning system causes a customer to read a barcode of the purchased-item with a scanner and receives registration for the purchased-item from the customer. Then, every time such a purchased-item is put in a register-bag, the self-scanning system performs weight determination by measuring a weight of the purchased-item with a measuring device provided under the register-bag (a scale under register-bag).

On the other hand, when a purchased-item is not attached with a barcode (e.g., daily dishes, sweets, or bread), the self-scanning system displays a list of items not attached with barcodes on a touch panel and receives registration for the purchased-item by causing the customer to designate the purchased-item and input a quantity of purchase on the touch panel. Then, the self-scanning system performs weight determination by measuring a weight of the purchased-item placed on a measuring device provided on a scanner (a scale on scanner) with the scale on scanner.

In the conventional technology described above, when a customer attempts to purchase plural kinds of items not attached with barcodes putting the items in one container, the self-scanning system cannot execute registration and weight determination for the purchased-items appropriately.

In the conventional technology, when the plural kinds of purchased-items not attached with barcodes are stored in one container, weight determination for all the items in the container is performed at a point when one kind of purchased-items is designated in a list displayed on the touch panel and a quantity of purchase is input. Thus, since the items, which are not designated, are also measured together with the designated item, a result of the weight determination turns out to be an error. Consequently, it is impossible to execute registration and weight determination for the purchased-items appropriately.

When such an error is output, although the self-scanning system is used, a salesclerk has to take the trouble to perform a mismatch processing (processing for giving an operation instruction to skip weight determination and, then, registering respective purchased-items in a container again without performing weight determination). As a result, reduction in labor cost for salesclerks is not realized. Moreover, when the mismatch processing is performed by a salesclerk, a customer may notice the operation instruction to skip weight determination. Thus, it is likely that the customer uses such an operation instruction for wrong purposes to perform illegal payment processing.

On the other hand, in order to avoid such problems, as a solution, it is conceivable to set a rule that only one kind of items can be stored in one container and cause customers and counter salespersons to comply with the rule thoroughly. However, this solution imposes not only large burdens on the customers and counter salespersons but also large burdens on shops in terms of man-hour and container cost. Therefore, it cannot be said that the solution is realistic.

SUMMARY OF THE INVENTION

It is an object of the present invention to at least solve the problems in the conventional technology.

A self-scanning system according to one aspect of the present invention, which receives a registration for a purchased-item from a customer, and performs a weight determination for the purchased-item, includes a specific-item-information storing unit that stores information on a specific item that can be contained in one container together with other item, in association with information indicating that the specific item is contained in one container together with the other item; a specific-item judging unit that judges, when the registration for the purchased-item is received, whether the purchased-item is a specific item based on the information stored in the specific-item-information storing unit; and a reception control unit that controls, when the specific-item judging unit judges that the purchased-item is a specific item, the self-scanning system to continue to receive a registration for other purchased-item and to perform the weight determination according to an instruction for completing the registration from the customer.

A purchased-item registering apparatus according to another aspect of the present invention, which is for a self-scanning system that receives a registration for a purchased-item from a customer, and performs a weight determination for the purchased-item, includes a specific-item-information storing unit that stores information on a specific item that can be contained in one container together with other item, in association with information indicating that the specific item is contained in one container together with the other item; a specific-item judging unit that judges, when the registration for the purchased-item is received, whether the purchased-item is a specific item based on the information stored in the specific-item-information storing unit; and a reception control unit that controls, when the specific-item judging unit judges that the purchased-item is a specific item, the self-scanning system to continue to receive a registration for other purchased-item and to perform the weight determination according to an instruction for completing the registration from the customer.

A purchased-item registering method according to still another aspect of the present invention, which is for a self-scanning system that receives a registration for a purchased-item from a customer and performs a weight determination for the purchased-item, includes storing information on a specific item that can be contained in one container together with other item, in association with information indicating that the specific item is contained in one container together with the other item; judging, when the registration for the purchased-item is received, whether the purchased-item is a specific item based on the information stored at the storing; and controlling, when it is judged that the purchased-item is a specific item, the self-scanning system to continue to receive a registration for other purchased-item and to perform the weight determination according to an instruction for completing the registration from the customer.

A computer-readable recording medium according to still another aspect of the present invention stores a computer program that causes a computer to execute the above purchased-item registering method according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
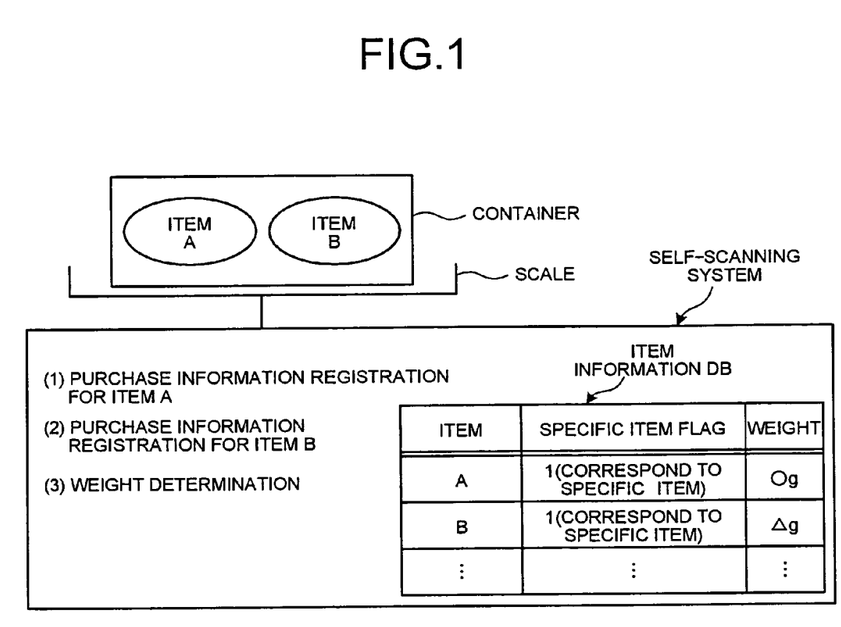
FIG. 1 is a schematic for explaining an outline and characteristics of a self-scanning system according to a first embodiment of the present invention.

FIG. 1 is a schematic for explaining outline and characteristic of a self-scanning system according to a first embodiment of the present invention. The self-scanning system is installed in a supermarket or the like. In the self-scanning system, customers themselves register purchased-items and perform payment processing. Specifically, when a purchased-item is attached with a barcode, the self-scanning system causes a scanner to read the barcode to receive registration for the purchased-item. Then, every time such a purchased-item is put in a register-bag, the self-scanning system performs weight determination (i.e., checks a barcode reading error) by measuring a weight of the purchased-item with a measuring device provided under the register-bag (a scale under register-bag).

On the other hand, when a purchased-item is not attached with a barcode (e.g., daily dishes, sweets, or bread), the self-scanning system displays a list of items not attached with barcodes on a touch panel and receives registration for the purchased-item by causing a customer to designate the purchased-item and input a quantity of purchase on the touch panel. Then, the self-scanning system performs weight determination (i.e., checks whether there is an error in the designation of the purchased-item and the input of the quantity of purchase by the customer) by measuring a weight of the purchased-item, which is placed on a measuring device provided on a scanner (a scale on scanner), with the scale on scanner.

The self-scanning system according to the first embodiment has a main characteristic that, even when a customer attempts to purchase plural kinds of items not attached with barcodes storing the items in one container, it is possible to execute registration and weight determination for the purchased-items appropriately. To explain this simply, as shown in FIG. 1, the self-scanning system stores an assumed weight in an item-information database (DB) in advance for each item. In addition, concerning specific items that can be stored in one container together with other items (e.g., croquettes, tempuras, and kakiages), the self-scanning system stores information indicating to that effect (a specific item flag "1") in association with the specific items.

When registration for a purchased-item is received, the self-scanning system judges whether the purchased-item is a specific item based on the item-information DB. As a result, when the purchased-item, for which registration is received, is not a specific item, the self-scanning system judges that a customer is attempting to register only one kind of purchased-items and performs weight determination immediately. Conversely, when the purchased-item, for which registration is received, is a specific item, the self-scanning system judges that it is likely that plural kinds of purchased-items are stored in the container and, rather than performing weight determination immediately, continues to receive registration for other purchased-items. In addition, the self-scanning system does not perform weight determination until an instruction for completion of registration is received from a customer.

When a purchased-item A and a purchased-item B are stored in one container, first, the self-scanning system receives registration for one of the purchased-items (e.g., the purchased-item A). Then, the self-scanning system judges whether the purchased-item is a specific item based on the item-information DB. In this example, since the purchased-item A is a specific item, the self-scanning apparatus continues to receive registration for the other purchased-item (the purchased-item B) rather than performing weight determination immediately. Thereafter, the self-scanning apparatus performs weight determination for a total weight of the purchased-item A and the purchased-item B when an instruction for completion of registration is received from a customer.

In this way, even when plural kinds of purchased-items not attached with barcodes are stored in one container, the self-scanning system according to the first embodiment performs weight determination after registration is completed for all the purchased-items. Thus, as indicated by the main characteristic, it is possible to execute registration and weight determination for the purchased-items appropriately.

Figure 2:
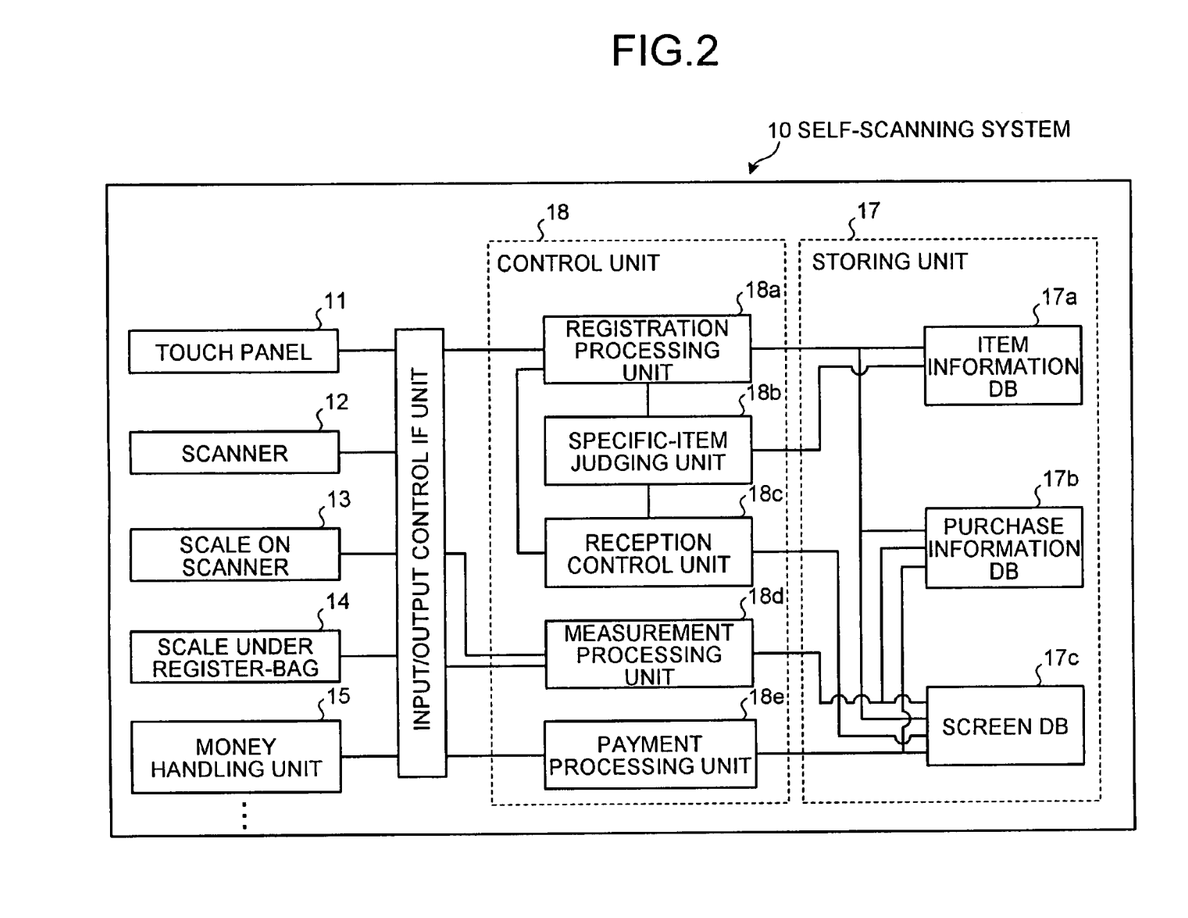
FIG. 2 is a block diagram of a structure of the self-scanning system according to the first embodiment.
Figure 3:
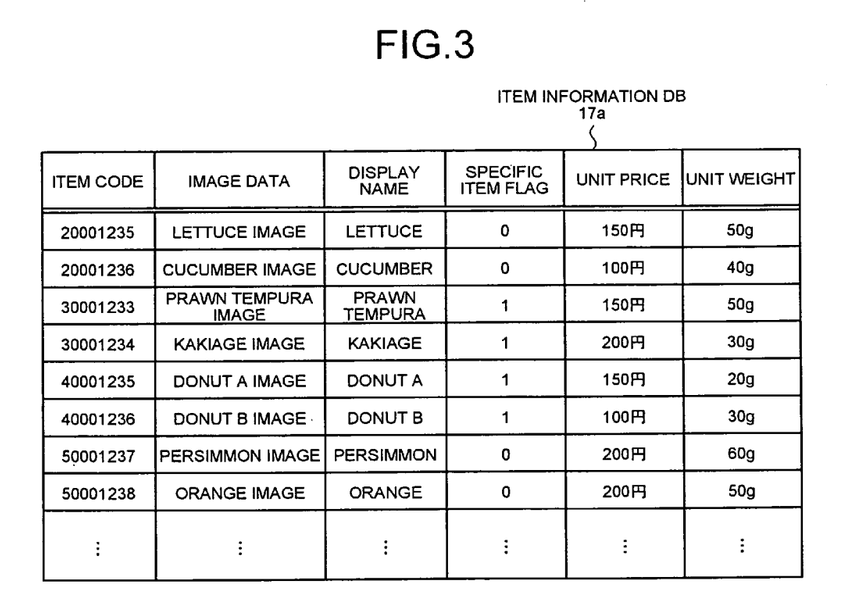
FIG. 3 is a table of an example of information stored in an item-information database (DB)
Figure 4:
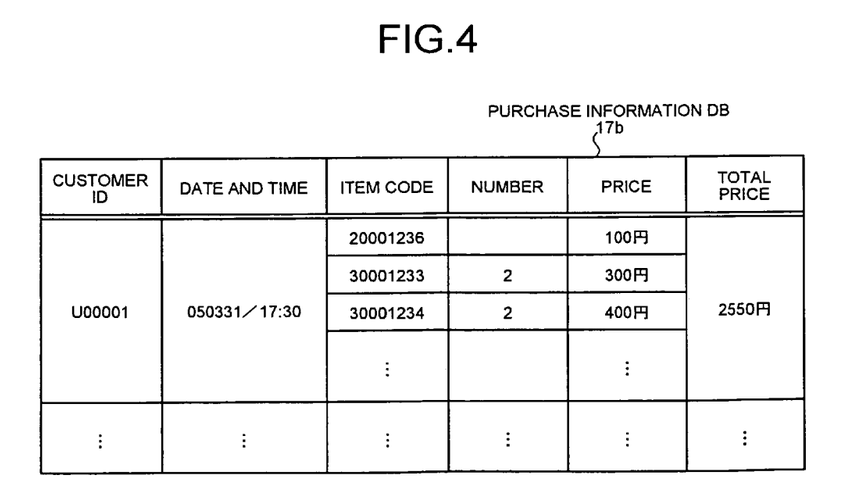
FIG. 4 is a table of an example of information stored in a purchase-information DB.

FIG. 2 is a block diagram of the structure of the self-scanning system according to the first embodiment. FIG. 3 is a table of an example of information stored in the item-information DB. FIG. 4 is a table of an example of information stored in the item-information DB. FIGS. 6 to 9 are schematics of examples of display on a touch panel.

As shown in FIG. 2, the self-scanning system 10 according to the first embodiment includes a touch panel 11, a scanner 12, a scale on scanner 13, a scale under register-bag 14, a input/output control interface (IF) 16, a storing unit 17, and a control unit 18. Note that, although not shown in FIG. 2, the self-scanning system 10 also includes a credit reader, a point reader, a receipt printer, a point-of-sale (POS) controller, a charge-coupled device (CCD) camera, and the like according to circumstances. The self-scanning system 10 is connected to a store server and an attendant station to be capable of communicating with each other.

In such a self-scanning system 10, the touch panel 11 serves not only as an input means that inputs various kinds of information but also as an output means that outputs various kinds of information. The touch panel 11 includes a liquid crystal display (LCD). For example, the touch panel 11 displays a list of items not attached with barcodes and receives designation of a purchased-item and input of a quantity of purchase from a customer (see FIGS. 6 to 9).

The scanner 12 reads a barcode attached to an item and inputs barcode information to the system. The scale on scanner 13 is means that measures a weight of a purchased-item (specifically, a purchased-item not attached with a barcode) placed on the scanner 12 and inputs weight information to the system. The scale under register-bag 14 is means that measures a weight of a purchased-item (specifically, a purchased-item attached with a barcode) put in a register-bag and inputs weight information to the system. The money handling unit 15 receives money necessary for payment and inputs received-money information to the system and, on the other hand, discharges change according to change information. The input/output control IF 16 is means that controls input and output of information by the touch panel 11, the scanner 12, the scale on scanner 13, the scale under register-bag 14, and the money handling unit 15.

The storing unit 17 is storing means that stores data and programs necessary for various kinds of processing performed by the control unit 18. The storing unit 17 includes, in particular, as databases closely related to the present invention, an item-information DB 17a, a purchase-information DB 17b, and a screen DB 17c as shown in FIG. 2. Note that the item-information DB 17a corresponds to a "specific-item-information storing unit" described in claims.

The item-information DB 17a stores information on items. Specifically, as shown in FIG. 3, the item-information DB 17a stores an item code for uniquely identifying respective items, image data, a display name, a specific item flag (a flag "1" for a specific item that can be stored in one container together with other items), a price, a weight, and the like in association with one another for each item.

The purchase-information DB 17b stores information on items purchased by a customer. Specifically, as shown in FIG. 4, the purchase-information DB 17b stores an item code, the number of purchased pieces, a charged amount, a total charged amount, and the like in association with a customer ID for uniquely identifying a customer and a date and time of purchase. The screen DB 17c stores screen data (see FIGS. 6 to 9) output for display on the touch panel 11.

The control unit 18 has an internal memory for storing programs and control data, which define various processing procedures, and executes various kinds of processing according to the programs and the control data. The control unit 18 includes, in particular, as units closely related to the present invention, a registration processing unit 18a, a specific-item judging unit 18b, a reception control unit 18c, a measurement processing unit 18d, and a payment processing unit 18e. Note that the specific-item judging unit 18b corresponds to a "specific-item judging unit" described in claims and the reception control unit 18c corresponds to a "reception control unit" in claims.

The registration processing unit receives registration for a purchased-item from a customer. Specifically, when a purchased-item is attached with a barcode, the registration processing unit 18a receives registration for the purchased-item by causing the scanner 12 to read the barcode. When a purchased-item is not attached with a barcode, the registration processing unit 18a displays a screen of a list of items not attached with barcodes on the touch panel 11. Then, the registration processing unit 18a receives registration for the purchased-item by causing a user to designate the purchased-item and input a quantity of purchase on the touch panel 11 (see FIGS. 6 to 9). The registration processing unit 18a registers purchase information in the purchase-information DB 17b according to reception of registration for the purchased-item.

The specific-item judging unit 18b judges, when registration is received for a purchased-item not attached with a barcode, whether the purchased-item is a specific item based on the item-information DB 17a. Note that, when the purchased-item is not a specific item, it is judged that only one kind of purchased-items is stored in a container and the following processing is performed. On the other hand, when the purchased-item is a specific item, it is judged that plural kinds of purchased-items are likely to be stored in the container and the following processing is performed.

The reception control unit 18c controls, when the specific-item judging unit 18b judges that a purchased-item for which registration is received is a specific item, the registration processing unit 18a to continue to receive registration for other purchased-items and perform weight determination according to an instruction for completion of registration from a customer. Specifically, as shown in (G) of FIG. 8, the reception control unit 18c controls the registration processing unit 18a to display a screen, which includes a "continue to register" button for continuing to receive registration for other purchased-items and a "complete" button for instructing completion of registration in addition to a ten-key pad for inputting a quantity of purchase, on the touch panel 11. Note that, when the specific-item judging unit 18b judges that a purchased-item, for which registration is received, is not a specific item, as shown in (D) of FIG. 7, the registration processing unit 18a displays a screen, which does not include the "continue registration" button and includes only the ten-key pad for inputting a quantity of purchase and the "complete" button, on the touch panel 11.

The measurement processing unit 18 performs, after registration for a purchased-item by the registration processing unit 18a, weight determination to judge whether there is an error in such registration operation. Specifically, when a purchased-item is attached with a barcode, every time the barcode is read via the scanner 12 and such a purchased-item is put in a register-bag, the measurement processing unit 18d measures a weight of the purchased-item with the scale under register-bag 14. Then, the measurement processing unit 18d judges whether a weight derived from the barcode (a weight derived from the item-information DB 17a) and an actual weight correspond to each other. When a purchased-item is not attached with a barcode, every time a purchased-item is designated and a quantity of purchase is input via the touch panel 11 and the "complete" button for instructing completion of registration is pressed, the measurement processing unit 18d measures a weight of a purchased-item placed on the scale on scanner 13. Then, the measurement processing unit 18d judges whether a weight derived from the purchased-item and the quantity of purchase designated on the touch panel 11 (a weight derived from the item-information DB 17a) and an actual weight correspond to each other. When both the weights do not correspond to each other, the measurement processing unit 18d performs NG processing, for example, displays an error on the touch panel 11 or gives an alarm to salesclerks.

The payment processing unit 18e performs payment processing after purchase information is stored in the purchase-information DB 17b for all purchased-items. More specifically, as shown in (I) of FIG. 9, after a screen including purchase information and a "payment" button is displayed on the touch panel 11 by the control of the registration processing unit 18a, when the "payment" button is pressed on the touch panel 11, the payment processing unit 18e receives money necessary for payment from the money handling unit 15, calculates change, and then discharges the change from the money handling unit 15.

Figure 5:
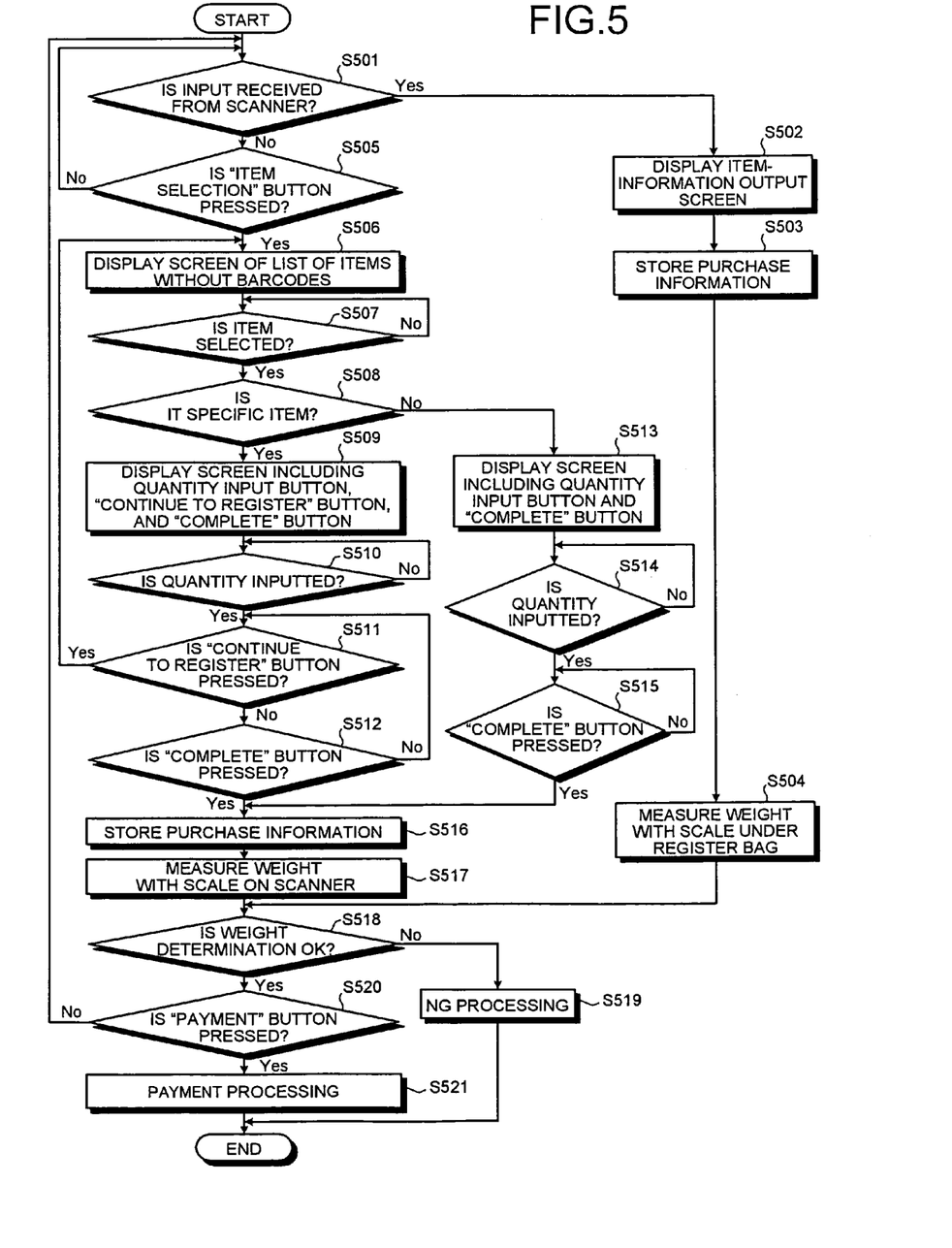
FIG. 5 is a flowchart of a process procedure for purchased-item reception processing.

FIG. 5 is a flowchart of the flow of the purchased-item reception processing. As shown in the figure, the self-scanning system 10 continuously checks whether a barcode of a purchased-item is read by the scanner 11 and whether a "item selection" button is pressed on the touch panel 11 (steps S501 to S505). Specifically, when a purchased-item is attached with a barcode, the registration processing unit 18a urges a customer to cause the scanner to read the barcode by displaying a screen as shown in (A) of FIG. 6 on the touch panel 11. When a purchased-item is not attached with a barcode, the registration processing unit 18a urges a customer to press the "item selection" button by displaying the screen on the touch panel 11.

When the barcode of the purchased-item is read by the scanner 11 ("Yes" at step S501), the registration processing unit 18a displays read information on the purchased-item (a name, image data, a price, etc.) on the touch panel 11 (step S502) and registers the purchase information in the purchase-information DB 18b (step S503). When such a purchased-item is put in a register-bag, the measurement processing unit 18d measures a weight of the purchased-item with the scale under register-bag 14 and judges whether a weight derived from the barcode (a weight derived from the item-information DB 17a) and an actual weight correspond to each other (step S518).

As a result, when both the weights do not correspond to each other ("No" at step S518), the measurement processing unit 18d performs NG processing, for example, displays an error on the touch panel 11 or gives an alarm to salesclerks (step S519). Conversely, when both the weights correspond to each other ("Yes" at step S518), the registration processing unit 18a displays a screen, which includes the purchase information and the "payment" button, on the touch panel 11. When the "payment" button is pressed on the touch panel 11 ("Yes" at step S520), the payment processing unit 18e performs payment processing (step S521). On the other hand, when the "payment" button is not pressed on the touch panel 11 ("No" at step S520), the self-scanning system 10 returns to step S501 and receives registration for other purchased-items anew.

Figure 7:
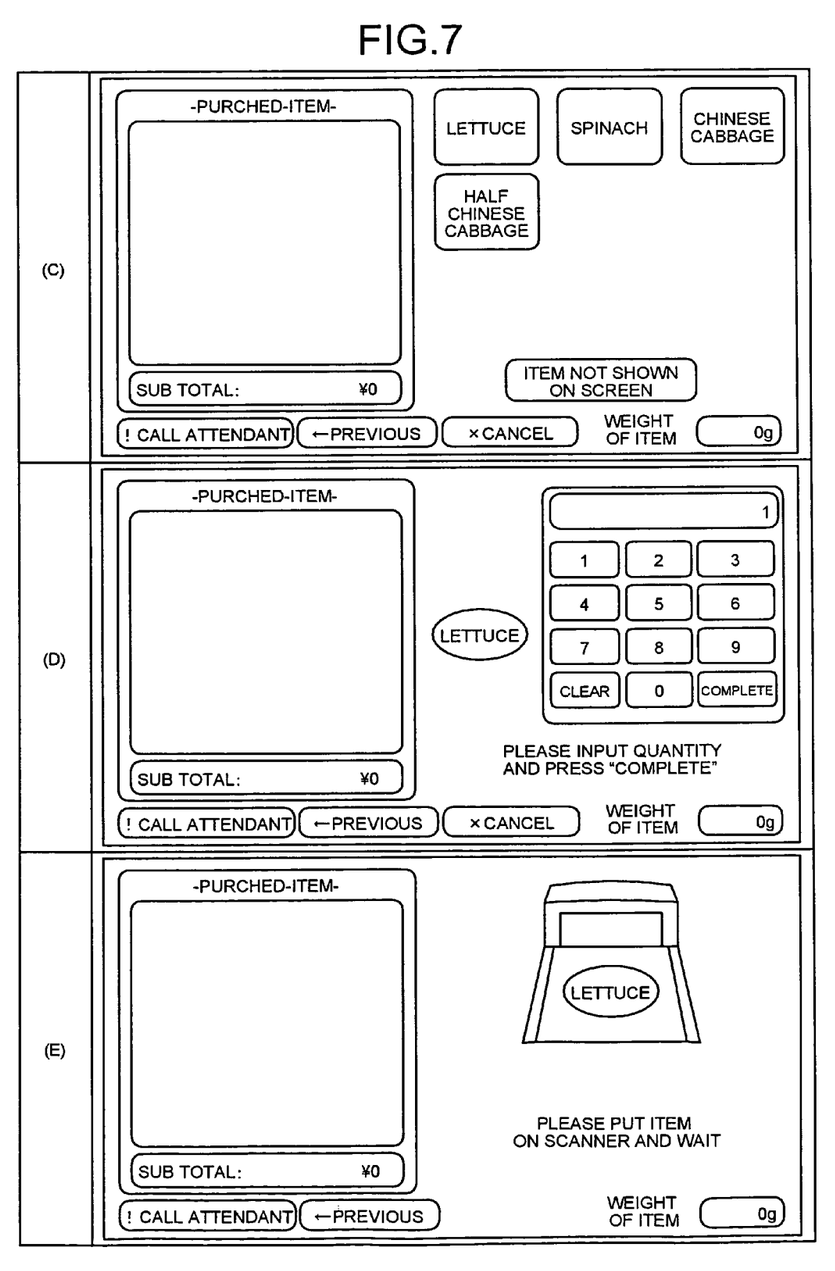
FIGS. 7 to 9 are schematics for illustrating examples of display on a touch panel.
Figure 8:
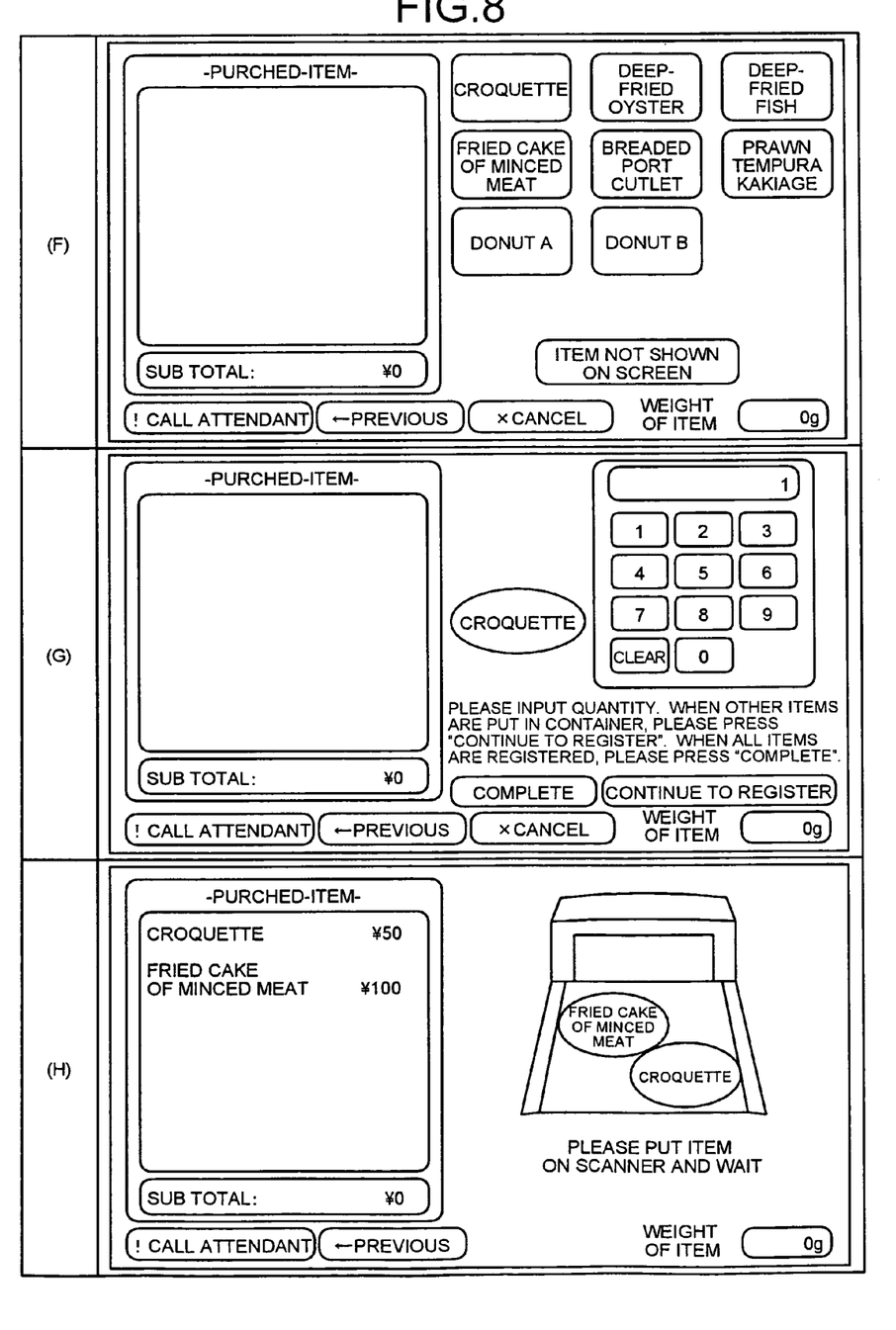
Figure 9:
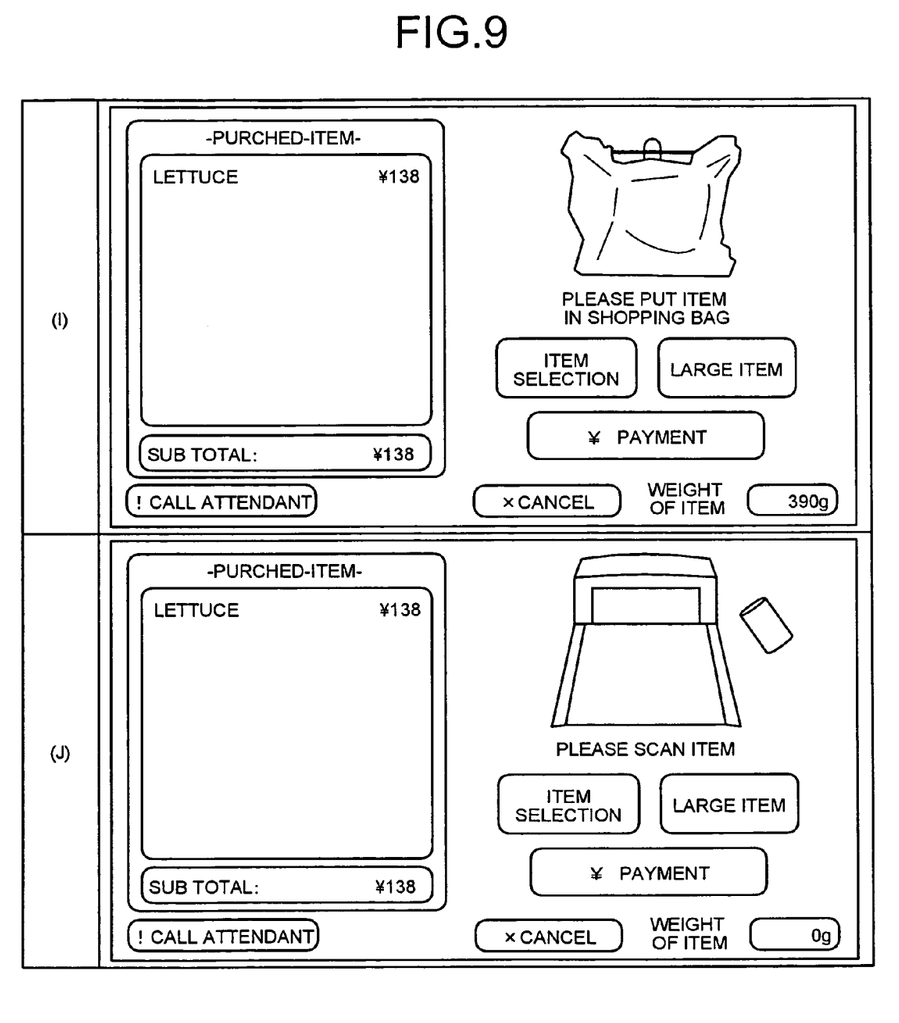

Returning to the explanation of steps S501 and s505, when the barcode of the purchased-item is not read by the scanner 11 ("No" at step S501) and the "item selection" button is pressed on the touch panel 11 ("Yes" at step S505), the registration processing unit 18a displays a list of items not attached with barcodes on the touch panel 11 and receives designation of a purchased-item on the touch panel 11 (step S506). Specifically, the registration processing unit 18a displays a screen shown in (B) of FIG. 6, (C) of FIG. 7, or (F) of FIG. 8 on the touch panel 11. Note that the screen shown in (C) of FIG. 7 is displayed after "leafy vegetables" is pressed on the screen shown in (B) of FIG. 6. The screen shown in (F) of FIG. 8 is displayed after "daily dishes" is pressed on the screen shown in (B) of FIG. 6.

When a purchased-item is selected and designated on such a screen ("Yes" at step S507), the specific-item judging unit 18b judges whether the designated purchased-item is a specific item based on the item-information DB 17a (step S508). When the purchased-item is not a specific item ("No" at step S508), the registration processing unit 18a displays a screen, which does not include the "continue to register" button and includes only the ten-key pad for inputting a quantity of purchase and the "complete" button, on the touch panel 11 (step S513).

When a quantity of purchase is input on such a screen ("Yes" at step S514) and the "complete" button is pressed ("Yes" at step S515), the registration processing unit 18a registers purchase information in the purchase-information DB 17b while displaying a screen shown in (E) of FIG. 7 (step S516). The measurement processing unit 18d measures a weight of a purchased-item, which is placed on the scale on scanner 13, with the scale on scanner 13 (step S517). Then, the measurement processing unit 18d judges whether a weight derived from the purchased-item and the quantity of purchase designated on the touch panel 11 (a weight derived from the item-information DB 17a) and an actual weight correspond to each other (step S518).

As a result, when both the weights do not correspond to each other ("No" at step S518), the measurement processing unit 18d performs NG processing, for example, displays an error on the touch panel 11 or gives an alarm to salesclerks (step S519). Conversely, when both the weights correspond to each other ("Yes" at step S518), as shown in (I) of FIG. 9, the registration processing unit 18a displays a screen, which includes the purchase information and the "payment" button, on the touch panel 11. When the "payment" button is pressed on the touch panel 11 ("Yes" at step S520), the payment processing unit 18e performs payment processing (step S521). On the other hand, when the "payment" button is not pressed on the touch panel 11 ("No" at step S520), the self-scanning system 10 returns to step S501, displays a screen shown in (J) of FIG. 9 on the touch panel 11, and receives registration for other purchased-items anew.

When the purchased-item designated at step S507 is a specific item ("Yes" at step S508), as shown in (G) of FIG. 8, the reception control unit 18c controls the registration processing unit 18a to display a screen, which includes the "continue to register" button for continuously receiving registration for other purchased-items and the "complete" button for instructing completion of registration other than the ten-key pad for inputting a quantity of purchase, on the touch panel 11 (step S509).

When a quantity of purchase is input on such a screen ("Yes" at step S510) and the "continue to register" button is pressed ("Yes" at step S511), the self-scanning system 10 returns to step S506. The registration processing unit 18a displays a list of items not attached with barcodes on the touch panel 11 and receives designation of other purchased-items (i.e., other purchased-items stored in one container together with the purchased-item designated at step S507) anew on the touch panel 11.

On the other hand, when a quantity of purchase is input on the screen shown in (G) of FIG. 8 ("Yes" at step S510) and the "complete" button is pressed ("Yes" at step S512), the registration processing unit 18a registers purchase information in the purchase-information DB 17b for the plural (or one) purchased-items designated in step S507 while displaying a screen shown in (H) of FIG. 8 on the touch panel 11 (step S516). Note that, in an example shown in (H) of FIG. 8, one "croquette" and one "fried cake of minced meat" are registered. The measurement processing unit 18d measures a weight of purchased-items placed on the scale on scanner 13 (i.e., a total weight of purchased-items stored in a container) with the scale on scanner 13 (step S517). Then, the measurement processing unit 18d judges whether a weight derived from the purchased-items and the quantity of purchase registered at step S516 (a weight derived from the item-information DB 17a) and an actual weight correspond to each other (step S518).

As a result, when both the weights do not correspond to each other ("No" at step S518), the measurement processing unit 18*d* performs NG processing, for example, displays an error on the touch panel 11 or gives an alarm to salesclerks (step S519). Conversely, when both the weights correspond to each other ("Yes" at step S518), the registration processing unit 18*a* displays a screen, which includes the purchase information and the "payment" button, on the touch panel 11. When the "payment" button is pressed on the touch panel 11 ("Yes" at step S520), the payment processing unit 18*e* performs payment processing (step S521). On the other hand, when the "payment" button is not pressed on the touch panel 11 ("No" at step S520), the self-scanning system 10 returns to step S501 and receives registration for other purchased-items anew.

As described above, according to the first embodiment, when registration for a purchased-item is received, the self-scanning system judges whether the purchased-item is a specific item that can be stored in one container together with other items. As a result of the judgment, when the purchased-item, for which registration is received, is not a specific item, the self-scanning system judges that only one kind of items is stored in the container and performs weight determination immediately. Conversely, when the purchased-item, for which registration is received, is a specific item, the self-scanning system judges that plural kinds of purchased-items are likely to be stored in the container and continues to receive registration for other purchased-items rather than immediately performing weight determination. In addition, the self-scanning system does not perform weight determination until an instruction for completion of registration is received from a customer. Therefore, even when plural kinds of purchased-items not attached with barcodes are stored in one container, it is possible to perform weight determination after all purchased-items are registered and execute registration and weight determination for the purchased-items appropriately.

As a result, a salesclerk no longer needs to uselessly perform mismatch processing (e.g., processing for giving an operation instruction to skip weight determination and, then, registering respective purchased-items in a container again without performing weight determination). This makes it possible to contribute to reduction in labor cost of salesclerks. Further, it is no longer likely that a customer notices an operation instruction to skip weight determination. This makes it possible to prevent illegal payment processing due to wrong use of such an operation instruction. Moreover, it is no longer necessary to set a rule that only one kind of items can be stored in one container. This makes it possible to realize reduction of burdens imposed on customers and counter salespersons and reduction in man-hour and container cost.

The present invention may be carried out in various different forms other than the first embodiment. Another embodiment of the present invention is explained below as a second embodiment of the present invention.

Figure 6:
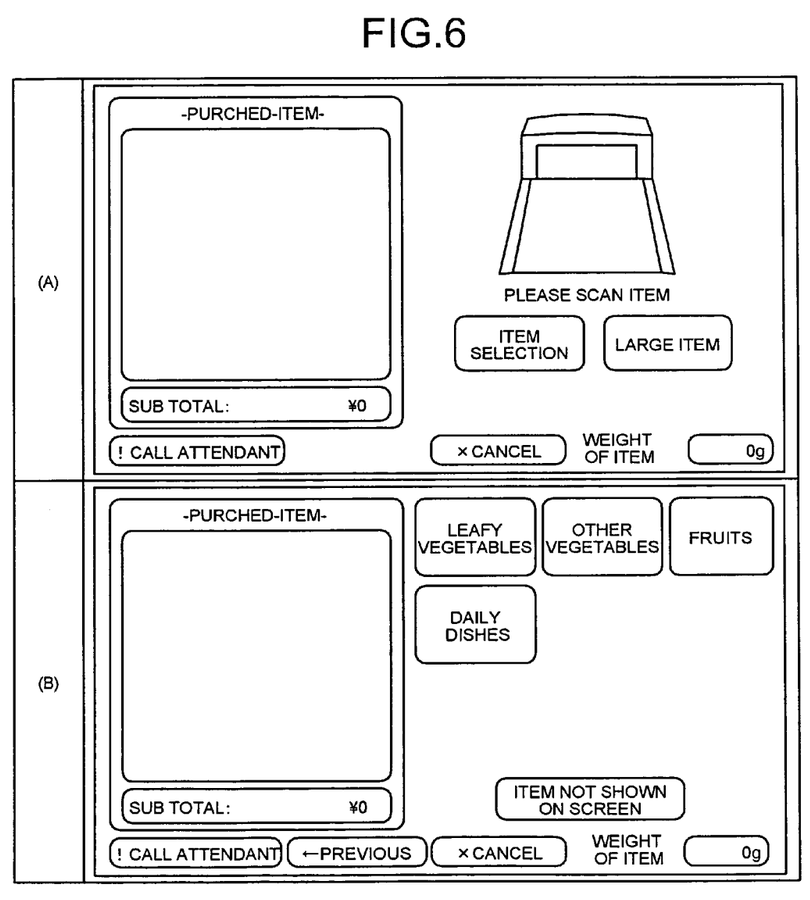
FIG. 6 is a schematic of an example of display on a touch panel.

For example, in the explanation of the first embodiment, when it is judged that a purchased-item is a specific item, the self-scanning system displays a list of items not attached with barcodes on the touch panel 11 (see (B) of FIG. 6) to continue to receive registration for other purchased-items (see step S506 in FIG. 5). However, the present invention is not limited to this. The self-scanning system may display a list including only specific items on the touch panel 11 to receive registration for other purchased-items out of the displayed specific items.

For example, when it is judged that a purchased-item is a specific item, the self-scanning system 10 may display a screen of a list including only specific items such as the screen shown in (F) of FIG. 8 on the touch panel 11. When the self-scanning system 10 continues to receive registration for other purchased-items in this way, the self-scanning system 10 does not display items other than the specific items (items that cannot be stored in one container together with other items) on the display unit. The self-scanning system 10 displays only the specific items on the display unit to receive registration for other purchased-items out of such specific items. This makes it possible for a customer to register a purchased-item smoothly compared with the time when a purchased-item is designated from a list including items other than the specific items.

When a list including only specific items is displayed on the touch panel 11 to receive registration for other purchased-items, the present invention is not limited to the example described above. For example, specific items, which are highly likely to be stored in one container together with purchased-items judged as specific items (e.g., items displayed in the same item showcase), may be displayed preferentially. This makes it possible for a customer to register a purchased-item more smoothly.

According to the first embodiment, designation of a purchased-item and input of a quantity of purchase are performed on separate screens. However, the present invention is not limited to this. Designation of a purchased-item and input of a quantity of purchase may be performed on one screen. In addition, according to the first embodiment, item buttons on a screen consist only of item names. However, the present invention is not limited to this. Item buttons consisting of item images (image data stored in the item-information DB 17*a*) may be displayed.

The respective components of the self-scanning system 10 shown in FIG. 2 are only functionally conceptual. The self-scanning system 10 is not always required to be physically configured as shown in the figure. In other words, a specific form of distribution and integration of components of the self-scanning system 10 is not limited to the form shown in the figure. It is possible to functionally or physically distribute or integrate all or a part of the components in an arbitrary unit to configure the self-scanning system 10 according to various loads, states of use, and the like. For example, the registration processing unit 18*a*, the specific-item judging unit 18*b*, and the reception control unit 18*c* of the control unit 18 may be integrated. Moreover, all or an arbitrary part of the various processing functions carried out in the self-scanning system 10 can be realized by a CPU and programs analyzed and executed by the CPU or realized as hardware based on a wired logic.

Among the processings explained according to the first embodiment, all or a part of the processings, which are explained to be performed automatically, can also be performed manually. All or a part of the processings, which are explained to be performed manually, can also be performed automatically according to a publicly known method. Besides, it is possible to arbitrary change the information including the processing procedure, the control procedure, the specific names, and the various data and parameters described in this specification and shown in the figures (in particular, the item information shown in FIG. 3, the purchase information shown in FIG. 4, and the screens shown in FIGS. 6 to 9) unless specifically noted otherwise.

Figure 10:
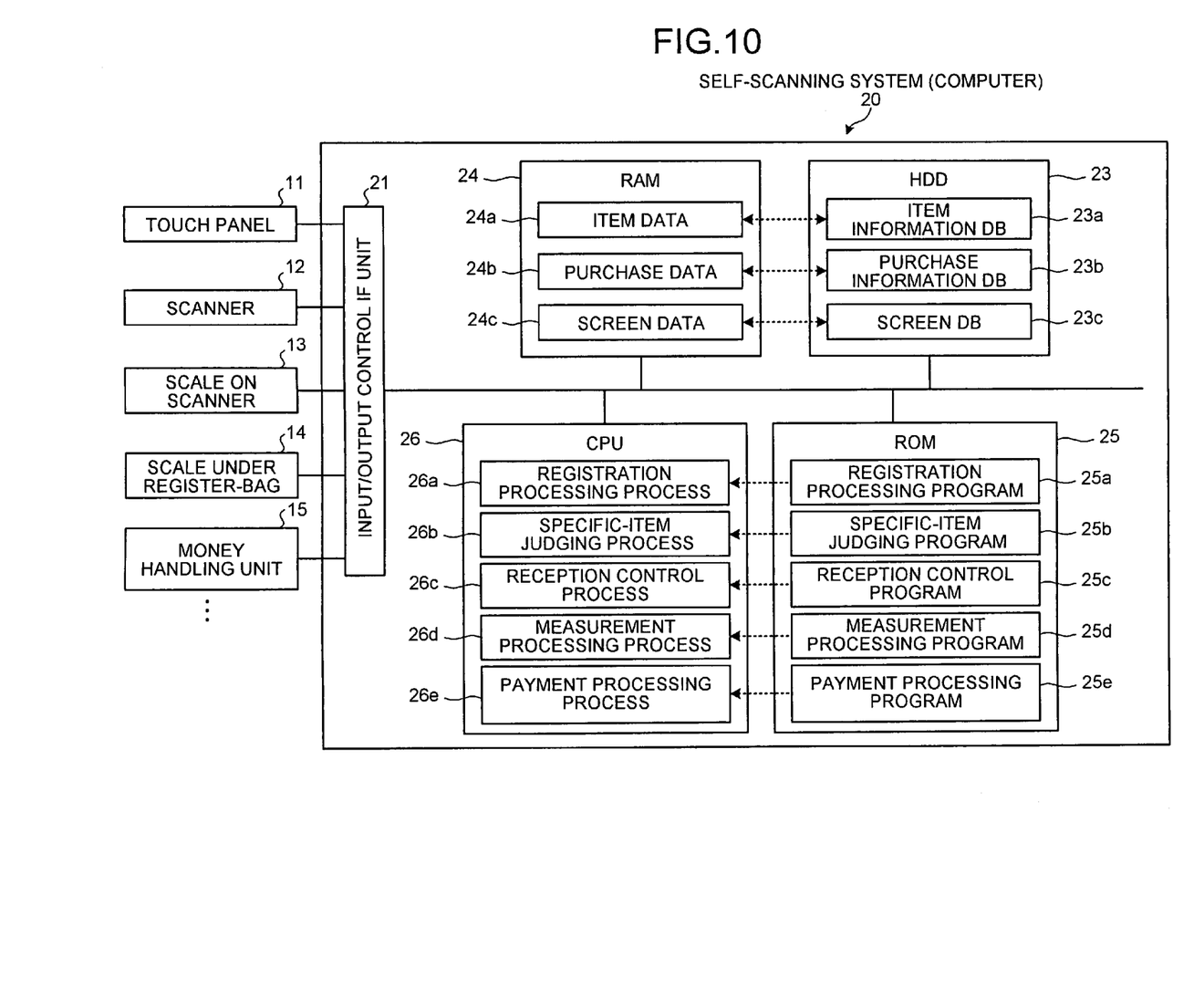
FIG. 10 is a block diagram of a computer that executes a self-scanning program.

It is possible to realize the various kinds of processing explained according to the first embodiment by executing a program prepared in advance using a computer. FIG. 10 is a block diagram of an example of a computer that executes a purchased-item registering program.

A computer 20 serving as a self-scanning system includes the touch panel 11, the scanner 12, the scale on scanner 13, the scale under register-bag 14, the money handling unit 15, a hard disk drive (HDD) 23, a random access memory (RAM) 24, a read only memory (ROM) 25, and a central processing unit (CPU) 26 connected by an input/output control unit 21 and a bus 29. The touch panel 11, the scanner 12, the scale on scanner 13, the scale under register-bag 14, and the money handling unit 15 correspond to those denoted by the same reference numerals in FIG. 2.

The self-scanning program implementing the same functions as those according to the first embodiment, that is, a registration processing program 25a, a specific item judging program 25b, a reception control program 25c, and a measurement processing program 25d, and a payment processing program 25e is stored in the ROM 25 in advance as shown in FIG. 10. Note that the programs 25a to 25e may be integrated or distributed according to circumstances in the same manner as the components of the self-scanning system 10 shown in FIG. 2.

The CPU 26 reads out these programs 25a to 25e from the ROM 25 and executes the programs. Consequently, as shown in FIG. 10, the programs 25a to 25e function as a registration processing process 26a, a specific item judging process 26b, a reception control process 26c, a measurement processing process 26d, and a settlement of account processing process 26e. Note that the processes 26a to 26e correspond to the registration processing unit 18a, the specific-item judging unit 18b, the reception control unit 18c, the measurement processing unit 18d, and the payment processing unit 18e shown in FIG. 2, respectively.

As shown in FIG. 10, the HDD 23 includes an item-information DB 23a, a purchase-information DB 23b, and a screen DB 23c. The DBs 23a to 23c correspond to the item-information DB 17a, the purchase-information DB 17b, and the screen DB 17c shown in FIG. 2, respectively. The CPU 26 executes various kinds of processing. For example, the CPU 26 reads out item data 24a of a purchased-item, which becomes an object of processing, from the item-information DB 23a and expands the item data 24a on the RAM 24. In addition, the CPU 26 registers purchase data 24b of a purchased-item, which is generated on the RAM 24, in the purchase-information DB 23b. Moreover, the CPU 26 reads out various screen data 24c from the screen DB 23c and expands the screen data 24c on the RAM 24.

Note that it is unnecessary to store the programs 25a to 25e in the ROM 25 from the beginning. For example, it is also possible that the programs are stored in portable physical media, fixed physical media, or other computers (servers) and the computer 20 reads out the programs from the media or the computers and executes the programs. The portable physical media are physical media like a flexible disk (FD), a compact disk ROM (CD-ROM), a magneto-optical (MO) disk, a digital versatile disk (DVD), and an integrated-circuit (IC) card that are inserted in the computer 20. The fixed physical media are provided inside and outside of the computer 20, such as an HDD. The computers are connected to the computer 20 via a public line, the internet, a local area network (LAN), a wide area network (WAN), and the like. To give an example, it is also possible that a CD-ROM storing a program for the self-scanning system described according to the first embodiment is distributed and the computer 20 reads out the program stored in the CD-ROM and executes the program.

According to the present invention, even when plural kinds of purchased-items not attached with barcodes are stored in one container, it is possible to perform weight determination after all purchased-items are registered and execute registration and weight determination for the purchased-items appropriately.

As a result, a salesclerk no longer needs to uselessly perform mismatch processing (e.g., processing for giving an operation instruction to skip weight determination and, then, registering respective purchased-items in a container again without performing weight determination). This makes it possible to contribute to reduction in labor cost of salesclerks. Further, it is no longer likely that a customer notices an operation instruction to skip weight determination. This makes it possible to prevent illegal payment processing due to wrong use of such an operation instruction. Moreover, it is no longer necessary to set a rule that only one kind of items can be stored in one container. This makes it possible to realize reduction of burdens imposed on customers and counter salespersons and reduction in man-hour and container cost.

Moreover, when the self-scanning system continues to receive registration for other purchased-items, the self-scanning system displays only specific items on the display unit without displaying items other than the specific items (items that cannot be stored in one container together with other items) and receives registration for other purchased-items out of such specific items. This makes it possible for a customer to register a purchased-item smoothly compared with the time when a purchased-item is designated from a list including items other than the specific items.

Furthermore, when only specific items are displayed on the display unit, the self-scanning system displays specific items, which are highly likely to be stored in one container together with purchased-items registered earlier (e.g., items displayed in the same item showcase), preferentially. This makes it possible for a customer to register a purchased-item more smoothly.

Although the present invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A self-scanning system that receives a registration for a purchased-item from a customer, and performs a weight determination for the purchased-item, the self-scanning system comprising:
   a specific-item-information storing unit that stores information on a specific item that can be contained in one container together with other item, in association with information indicating that the specific item is contained in one container together with the other item;
   a specific-item judging unit that judges, when the registration for the purchased-item is received, whether the purchased-item is a specific item based on the information stored in the specific-item-information storing unit; and
   a reception control unit that controls, when the specific-item judging unit judges that the purchased-item is a specific item, the self-scanning system to continue to receive a registration for other purchased-item and to perform the weight determination according to an instruction for completing the registration from the customer.

2. The self-scanning system according to claim 1, wherein the reception control unit displays, when the self-scanning system continues to receive the registration for the other purchased-item, only the specific item on a predetermined display unit, and controls the self-scanning system to receive the registration for the other purchased-item from among the specific item displayed.

3. The self-scanning system according to claim 2, wherein the reception control unit displays, when displaying the specific item on the predetermined display unit, a specific item that is highly likely to be contained in the one container together with a purchased-item judged as the specific item by the specific-item judging unit, by priority.

4. A purchased-item registering apparatus for a self-scanning system that receives a registration for a purchased-item from a customer, and performs a weight determination for the purchased-item, the purchased-item registering apparatus comprising:
- a specific-item-information storing unit that stores information on a specific item that can be contained in one container together with other item, in association with information indicating that the specific item is contained in one container together with the other item;
- a specific-item judging unit that judges, when the registration for the purchased-item is received, whether the purchased-item is a specific item based on the information stored in the specific-item-information storing unit; and
- a reception control unit that controls, when the specific-item judging unit judges that the purchased-item is a specific item, the self-scanning system to continue to receive a registration for other purchased-item and to perform the weight determination according to an instruction for completing the registration from the customer.

5. A purchased-item registering method for a self-scanning system that receives a registration for a purchased-item from a customer, and performs a weight determination for the purchased-item, the purchased-item registering method comprising:
- storing information on a specific item that can be contained in one container together with other item, in association with information indicating that the specific item is contained in one container together with the other item;
- judging, when the registration for the purchased-item is received, whether the purchased-item is a specific item based on the information stored at the storing; and
- controlling, when it is judged that the purchased-item is a specific item, the self-scanning system to continue to receive a registration for other purchased-item and to perform the weight determination according to an instruction for completing the registration from the customer.

6. A computer-readable recording medium that stores a computer program for a self-scanning system that receives a registration for a purchased-item from a customer, and performs a weight determination for the purchased-item, wherein the computer program causes a computer to execute:
- storing information on a specific item that can be contained in one container together with other item, in association with information indicating that the specific item is contained in one container together with the other item;
- judging, when the registration for the purchased-item is received, whether the purchased-item is a specific item based on the information stored at the storing; and
- controlling, when it is judged that the purchased-item is a specific item, the self-scanning system to continue to receive a registration for other purchased-item and to perform the weight determination according to an instruction for completing the registration from the customer.

* * * * *